United States Patent
Kong et al.

(10) Patent No.: US 8,607,549 B2
(45) Date of Patent: Dec. 17, 2013

(54) CONTROLLING REGENERATION OF AN EMISSION CONTROL DEVICE

(75) Inventors: Jian Kong, Canton, MI (US); Kevin Chen, Canton, MI (US); Kirk Andrew Parrish, Grass Lake, MI (US); Jeff Malcolm Travis, Dexter, MI (US); Christopher Oberski, Plymouth, MI (US); Michiel J. Van Nieuwstadt, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 543 days.

(21) Appl. No.: 12/691,565

(22) Filed: Jan. 21, 2010

(65) Prior Publication Data

US 2011/0023467 A1 Feb. 3, 2011

Related U.S. Application Data

(60) Provisional application No. 61/230,577, filed on Jul. 31, 2009.

(51) Int. Cl.
*F01N 3/00* (2006.01)

(52) U.S. Cl.
USPC ............ 60/295; 60/286; 60/297; 60/303; 60/311

(58) Field of Classification Search
USPC ............ 60/295, 303, 311, 280, 297, 286
See application file for complete search history.

(56) References Cited

U.S. PATENT DOCUMENTS

| | | | |
|---|---|---|---|
| 4,811,223 A * | 3/1989 | Iwatsuki et al. | 701/99 |
| 6,817,174 B1 * | 11/2004 | Igarashi et al. | 60/295 |
| 7,231,761 B2 | 6/2007 | Okugawa et al. | |
| 7,313,913 B2 | 1/2008 | Okugawa et al. | |
| 2001/0032459 A1 * | 10/2001 | Hirota et al. | 60/297 |

(Continued)

FOREIGN PATENT DOCUMENTS

| | | |
|---|---|---|
| EP | 1662101 | 5/2006 |
| EP | 1662101 A1 * | 5/2006 |

(Continued)

OTHER PUBLICATIONS

EP 1662101 Translation.*

(Continued)

*Primary Examiner* — Thomas Denion
*Assistant Examiner* — Patrick Maines
(74) *Attorney, Agent, or Firm* — Julia Voutyras; Alleman Hall McCoy Russell & Tuttle LLP (57) ABSTRACT

In one approach a method for operating an engine including a DPF is provided. The method includes adjusting a post fuel injection amount based on a rate of change of engine torque during DPF regeneration. As one example, the adjusting includes reducing the amount when the rate of change is positive, and increasing the amount when the rate of change is negative. Furthermore, the method may also include delivering exhaust gas to a turbocharger turbine, to an oxidation catalyst, and then a DPF, the adjusting of the post fuel injection further based on thermal inertia of the turbocharger.

20 Claims, 4 Drawing Sheets

(56) References Cited

U.S. PATENT DOCUMENTS

| | | |
|---|---|---|
| 2004/0123590 A1* | 7/2004 | Tabata et al. ............ 60/295 |
| 2005/0086929 A1* | 4/2005 | Nieuwstadt et al. ........ 60/274 |
| 2005/0153828 A1* | 7/2005 | Uekusa et al. ............ 502/60 |
| 2005/0284138 A1* | 12/2005 | Imai et al. ............ 60/295 |
| 2006/0130468 A1* | 6/2006 | Sun et al. ............ 60/297 |
| 2007/0012034 A1* | 1/2007 | Yahata et al. ............ 60/295 |
| 2007/0056265 A1* | 3/2007 | Colignon ............ 60/277 |
| 2007/0130925 A1* | 6/2007 | Ueno ............ 60/295 |
| 2007/0251220 A1* | 11/2007 | Dawson et al. ............ 60/295 |
| 2008/0092533 A1 | 4/2008 | Tennison |
| 2008/0120962 A1 | 5/2008 | Okugawa et al. |
| 2009/0217647 A1* | 9/2009 | Daneau ............ 60/286 |
| 2011/0099997 A1* | 5/2011 | Singh et al. ............ 60/602 |

FOREIGN PATENT DOCUMENTS

| | | | | |
|---|---|---|---|---|
| FR | 2880655 A1 | * | 7/2006 | |
| JP | 2003065132 A | * | 3/2003 | ........ F02D 41/34 |
| JP | 2003155913 A | * | 5/2003 | ........ F01N 3/02 |
| JP | 2003206722 A | * | 7/2003 | ........ F01N 3/02 |
| JP | 2003307117 A | * | 10/2003 | ........ F01N 3/02 |
| JP | 2006316743 A | * | 11/2006 | |
| JP | 2006348905 A | * | 12/2006 | |
| JP | 2011027008 A | * | 2/2011 | |
| JP | 2011027010 A | * | 2/2011 | |
| JP | 2011132949 A | * | 7/2011 | |
| WO | WO 2005088094 A1 | * | 9/2005 | ........ F01N 9/00 |

OTHER PUBLICATIONS

Machine Translation of JP-2006-348905.*

* cited by examiner

FIG. 5A
LEAN FUEL INJECTION STRATEGY

FIG. 5B
STEADY STATE FUEL INJECTION STRATEGY DURING REGENERATION

FIG. 5C
TRANSIENT FUEL INJECTION STRATEGY DURING REGENERATION

FIG. 5D
TRANSIENT FUEL INJECTION STRATEGY DURING REGENERATION

CONTROLLING REGENERATION OF AN EMISSION CONTROL DEVICE

CROSS REFERENCE TO RELATED APPLICATIONS

The present application claims priority to U.S. Provisional Patent Application No. 61/230,577, filed Jul. 31, 2009, titled "Controlling Regeneration of an Emission Control Device," the entire contents of each of which are incorporated herein by reference.

BACKGROUND AND SUMMARY

Emission control devices, such as diesel particulate filters (DPF), may reduce the amount of soot emissions from a diesel engine by trapping soot particles. Such devices may be regenerated during operation of a turbocharged engine by operating above a regeneration temperature to decrease the amount of trapped particulate matter. An increase in exhaust temperature may be generated in various ways, including a far post injection of fuel that at least partially reacts exothermically in the exhaust system, such as in an oxidation catalyst upstream of the particulate filter. At the same time, the various exhaust components and emission control devices may have upper temperature limits beyond which thermal degradation can occur.

The inventors herein have recognized that in systems such as those noted above, temperature control, particularly of temperatures within the emission control system, may be degraded during transient engine operation. For example, relatively large and rapid change in mass air flow, fuel flow, or other parameters may generate a temporary mismatch in the response of gas flow through the system as compared to fuel flow through the system. Such mismatches can cause temperatures to temporarily rise too high during acceleration, and fall too low during deceleration. Likewise, turbocharger thermal inertial can also affect accurate temperature control, including generating extended drops in temperature during acceleration (due to turbocharger warm-up), and extended increases in temperature during deceleration (due to turbocharger cool-down).

As such, in one approach a method for operating an engine including a DPF is provided. The method includes adjusting a post fuel injection amount based on a rate of change of engine torque during DPF regeneration. As one example, the adjusting includes reducing the amount when the rate of change is positive, and increasing the amount when the rate of change is negative. In this way, it is possible to anticipate the transient over-temperature and/or under-temperature conditions due to the mismatch in transient fueling to transient engine flow, since the rate of change of engine torque correlates to, yet antedates, such effects.

Furthermore, the method may also include delivering exhaust gas to a turbocharger turbine, to an oxidation catalyst, and then a DPF, the adjusting of the post fuel injection further based on thermal inertia of the turbocharger. In this way, it possible to account for the extended temperature differences due to the turbocharger inertia, while still responding to transient changes in engine torque.

As such, regeneration of the DPF may be accurately controlled, while decreasing the likelihood of thermal degradation of the DPF or other emission control devices in the emission control system.

It should be understood that the background and summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
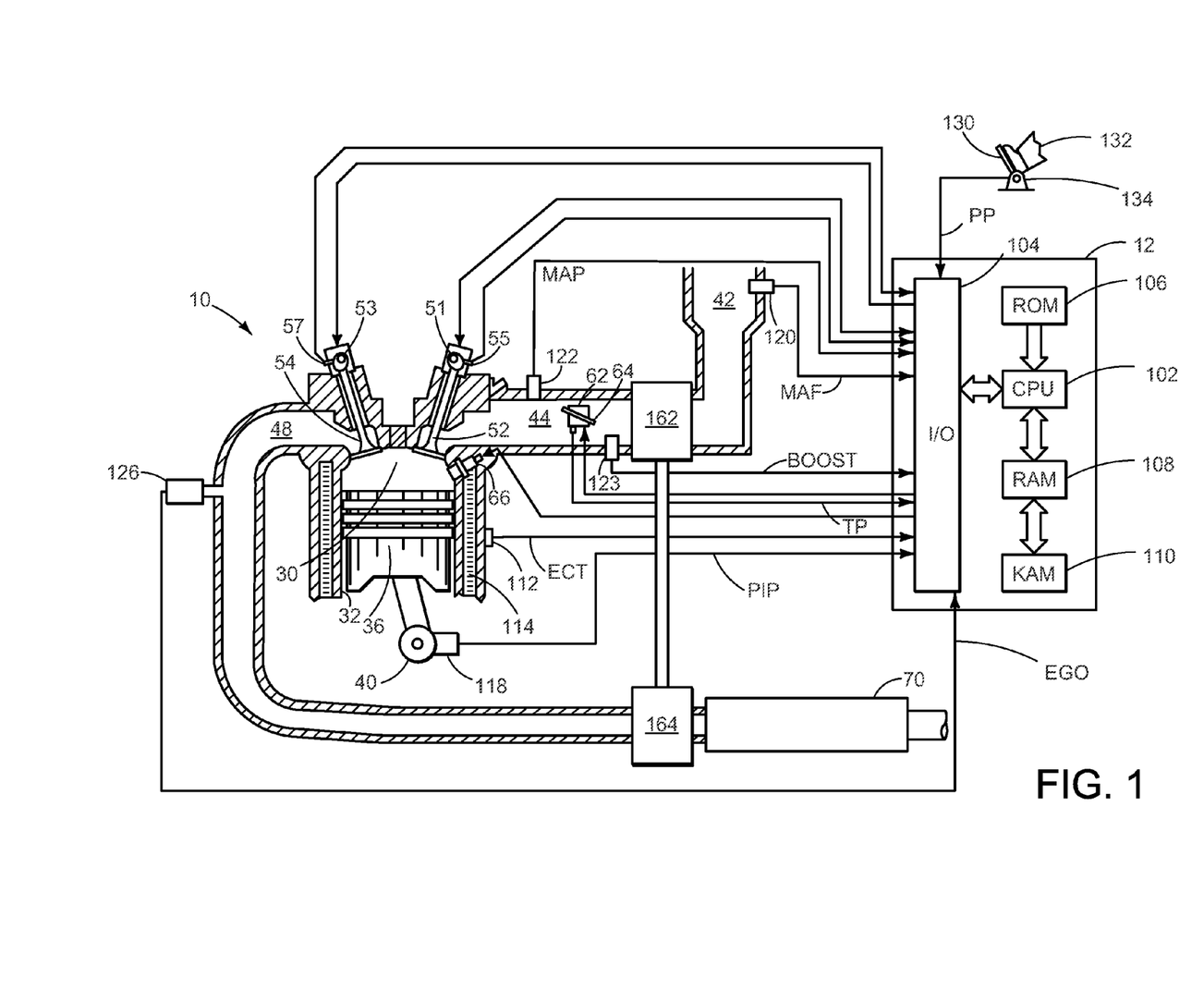
FIG. 1 shows a schematic depiction of an internal combustion engine.
Figure 2:
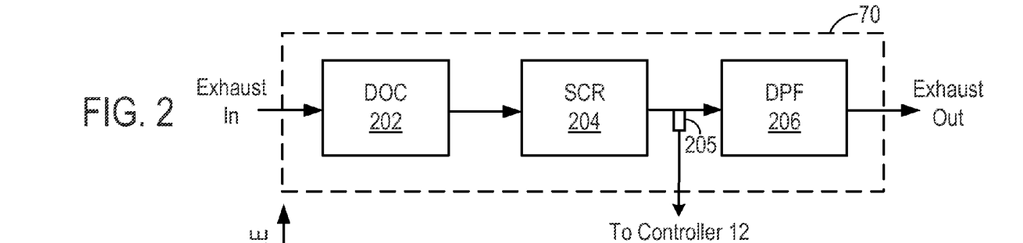
FIG. 2 shows a schematic depiction of an exemplary emission control system.
Figures 3A, 3B:
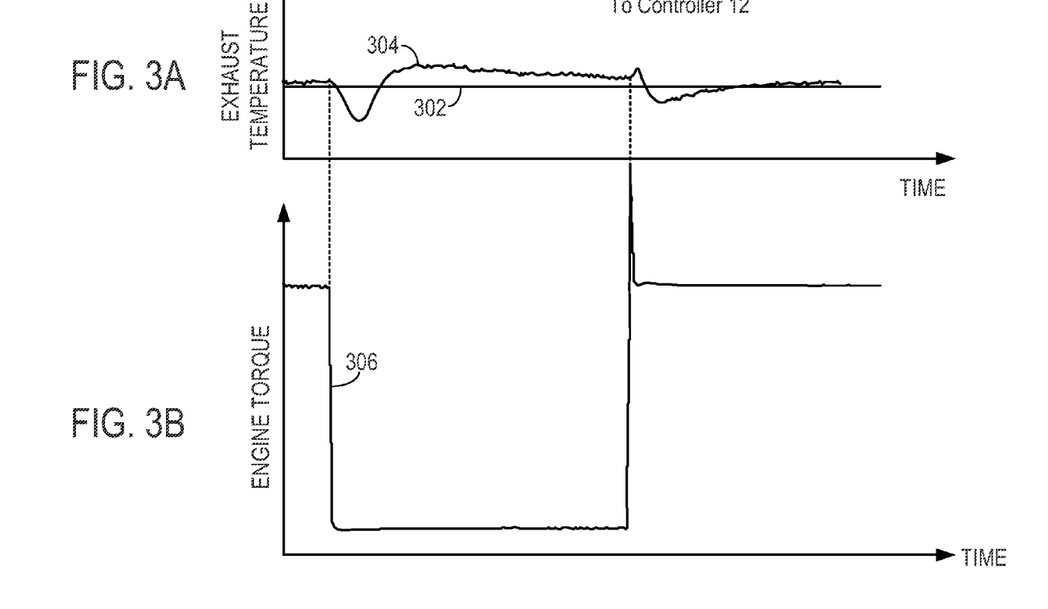
FIGS. 3A and 3B shows a graph depicting a prior art temperature control strategy, which does not compensate for transient operation.

It may be difficult to accurately control regeneration of a diesel particulate filter (DPF) in a turbocharged compression ignition internal combustion engine, such as shown in FIGS. 1-2, during transient operation (e.g. engine acceleration or deceleration) due to various factors. The factors may include the disparity in response time between the fuel path and the air path in the intake. In some instances the response of the fuel path may be faster than the response of the air path. That is to say that during transient engine operation the amount of fuel is injected into the intake manifold may correspond to steady state levels while the air-flow within the intake manifold is still changing according to transient conditions. Therefore, as shown in FIG. 3A, an overdose or an underdose of fuel may occur while the engine is in transient operation. Consequently, the overdose or underdose may increase or decrease the exhaust temperature above or below levels which may facilitate regeneration of the DPF. Furthermore, after the temperature increase or decrease, caused by the over-dose or under-dose injection, it may take an extended period of time to return to the temperature set-point due to the thermal inertia of the turbocharger. Thus after a correction is made for the temperature overshoot it may take an extended time interval for the exhaust temperature to return to the set-point.

Figure 4:
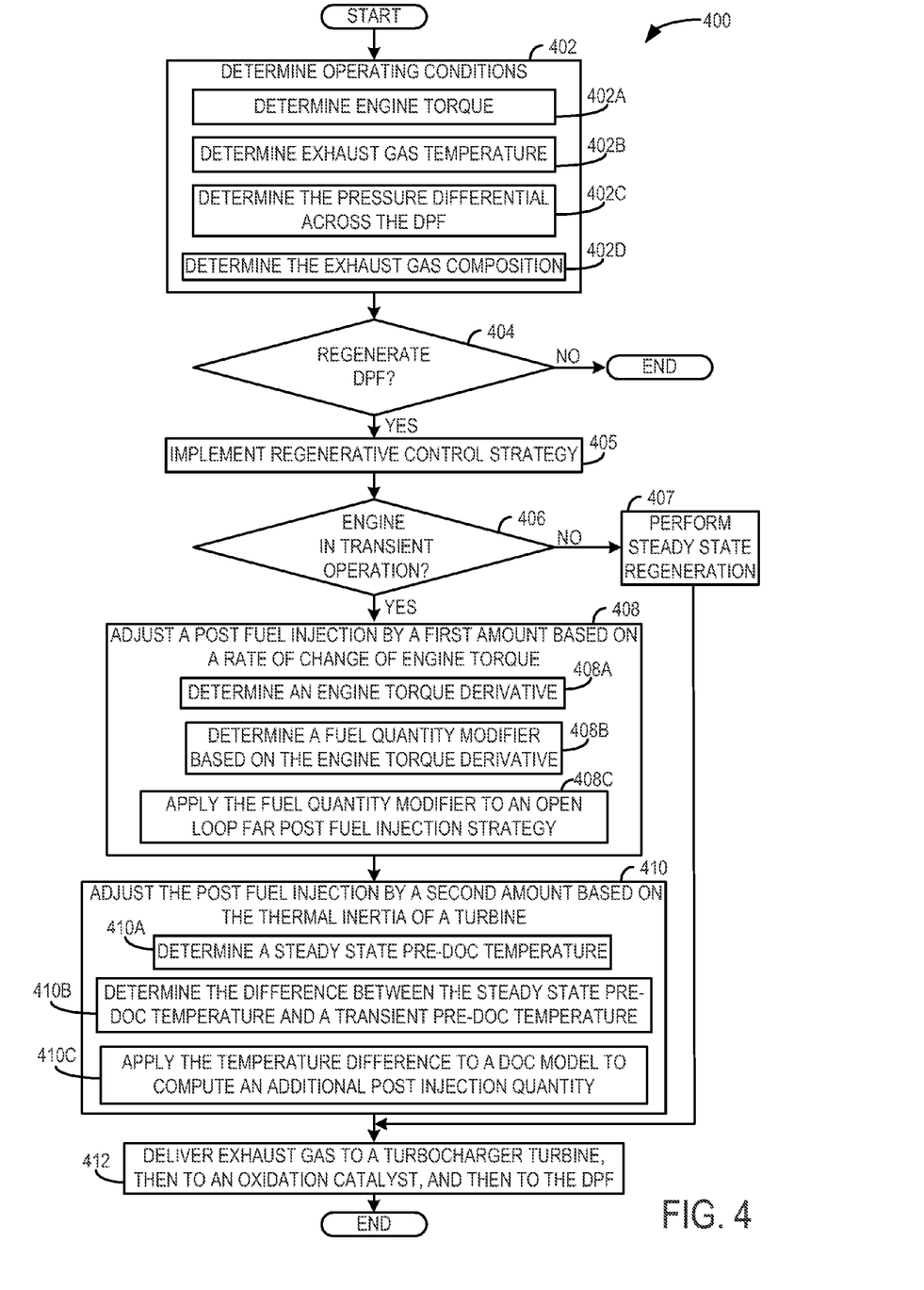
FIG. 4 shows a control strategy for regeneration of an emission control device.

As such in one approach, a correlation between the above temperature errors and a rate of change of engine torque, as illustrated in FIG. 3B, may be used. For example, a method for operating an engine including a DPF is provided, as shown in FIG. 4. The method may include adjusting a post fuel injection amount based on a rate of change of engine torque during DPF regeneration. As one example, the adjusting includes reducing the amount when the rate of change is positive, and increasing the amount when the rate of change is negative, as compared with steady engine torque conditions, such ask shown in FIGS. 5A-D. In this way, it is possible to anticipate the transient over-temperature and/or under-temperature conditions due to the mismatch in transient fueling to transient engine flow, since the rate of change of engine torque correlates to, yet antedates, such effects.

Furthermore, the method may also include delivering exhaust gas to a turbocharger turbine, to an oxidation catalyst, and then a DPF, the adjusting of the post fuel injection further based on thermal inertia of the turbocharger. In this way, it possible to account for the extended temperature differences due to the turbocharger inertia, while still responding to transient changes in engine torque.

FIG. 1 is a schematic diagram showing one cylinder of multi-cylinder internal combustion engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail, which may be a common fuel rail. In some embodiments, combustion chamber 30 may alternatively or additionally include a fuel injector arranged in intake manifold 44 in a configuration that provides what is known as port injection of fuel into the intake port upstream of combustion chamber 30. Intake manifold 44 may include a throttle 62 having a throttle plate 64. However, in other examples, the throttle may be located in intake passage 42. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 for providing a MAF signal to controller 12. Intake manifold 44 may include a manifold air pressure sensor 122 for providing a MAP signal to controller 12. Additionally, an air pressure sensor may also be included in intake passage 42, in some examples.

In this embodiment the engine is a diesel engine configured to combust diesel fuel (e.g. petroleum diesel or bio-diesel) via compression ignition. Exhaust gas sensor 126 is shown coupled to exhaust passage 48 upstream of emission control system 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor. Emission control system 70 is shown arranged along exhaust passage 48 downstream of exhaust gas sensor 126. System 70 may include a diesel oxidation catalyst (DOC), a selective catalytic reduction (SCR) catalyst, and a diesel particulate filter (DPF), discussed in greater detail herein with regard to FIG. 2. In some embodiments, during operation of engine 10, various components within emission control system 70 may be regenerated. Regeneration may include adjusting the amount of fuel injected into the cylinder to adjust the air/fuel ratio in at least one cylinder of the engine.

To regenerate the DPF a regeneration injection strategy may be implemented. The regeneration injection strategy may implement an injection profile including a plurality of injection events such as a pilot fuel injection, a main fuel injection, a near post fuel injection, and/or a far post fuel injection. It will be appreciated that the aforementioned fuel injections may include a plurality of injection events, in other embodiments. The pilot fuel injection may be delivered to the cylinder during a compression stroke, in some examples. Moreover, the main fuel injection may be delivered to the cylinder during a power stroke. However, in other examples, the main fuel injection may be delivered to the cylinder at least partially during a compression stroke. The near post fuel injection may be delivered to the cylinder near the beginning of the power stroke while the piston is proximate to the top dead center (TDC) of the cylinder. The far post fuel injection may be delivered to the cylinder near the end of the power stroke while the piston is proximate to the bottom dead center (BDC) of the cylinder. In some examples, a far post fuel injection may include a fuel injection which is delivered during the second half of a power stroke and a near post fuel injection may include a fuel injection which is delivered during the first half of a power stroke. However, it will be appreciated that in other examples the near and far post injections may be characterized via other metrics. For example, a far post injection may include one or more fuel injection events which do not significantly increase the torque produced by the engine and a near post injection may include one or more fuel injection events which significantly increase the torque produced by the engine. The near and/or far post fuel injection may be implemented to raise the temperature of the exhaust gas via an at least partial exothermic reaction to regenerate the DPF. It will be appreciated that in some examples, the pilot fuel injection and/or the near post fuel injection may not be delivered to the cylinder during regeneration of the DPF. Various regeneration strategies including post injection strategies are discussed in greater detail herein.

Engine 10 may further include a compression device such as a turbocharger or supercharger including at least a compressor 162 arranged along intake manifold 44. For a turbocharger, compressor 162 may be at least partially driven by a turbine 164 (e.g., via a shaft) arranged along exhaust passage 48. For a supercharger, compressor 162 may be at least partially driven by the engine and/or an electric machine, and may not include a turbine. Thus, the amount of compression (e.g. boost) provided to one or more cylinders of the engine via a turbocharger or supercharger may be varied by controller 12. Further, a sensor 123 may be disposed in intake manifold 44 for providing a BOOST signal to controller 12.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 106 can be programmed with computer readable data representing instructions executable by processor 102 for performing the methods and control strategies described below as well as other variants that are anticipated but not specifically listed.

As described above, FIG. 1 shows only one cylinder of a multi-cylinder engine, and that each cylinder may similarly include its own set of intake/exhaust valves, fuel injector, spark plug, etc.

FIG. 2 shows a schematic depiction of an exemplary emission control system 70. The emission control system 70 may include at least one diesel oxidation catalyst (DOC) 202 coupled upstream of at least one selective catalytic reduction (SCR) catalyst 204 and at least one diesel particulate filter (DPF) 206 coupled downstream of the SCR catalyst. However, it will be appreciated that alternate emission control system configurations may be used in alternate embodiments. For example, SCR catalyst 204 may be coupled downstream of the DPF. Further in other examples, a plurality of diesel particulate filters may be included in the emission control system. Still further, in other examples the SCR catalyst may not be included in the emission control system. Each catalyst, filter, etc., may be enclosed within a single housing or alternatively may be enclosed via separate housing. It will be appreciated that numerous arrangements are possible and the arrangement depicted in FIG. 2 is exemplary in nature. Further still, a reductant (e.g., ammonia or urea) injection system may be coupled to the exhaust to inject urea upstream of SCR catalyst 204.

A temperature sensor 205 may coupled in the exhaust stream interposed between the SCR catalyst and the DPF. Temperature sensor 205 may be electronically coupled to controller 12. In this way, the temperature of the exhaust gas upstream of the DPF may be sensed. However, it will be appreciated that in other examples the temperature of the exhaust gas may be calculated. Still further in other examples, additional or alternative sensors may be included in the emission control system such as a temperature sensor in the exhaust stream interposed between the DOC and the SCR catalyst.

The DPF may be regenerated during operation of the engine. During regeneration the temperature downstream of the DOC may be controlled to a desired value to promote combustion of particulate matter within the DPF. Therefore, a temperature set-point downstream of the DOC and upstream of the DPF may be established to facilitate regeneration of the DPF. A post fuel injection, such as a far post fuel injection, may be delivered substantially during a power stroke or an exhaust stroke, allowing unburnt fuel to be delivered to the exhaust and thereby adjust the temperature of the exhaust gas without substantially altering engine torque. Thus unburnt fuel may travel into the exhaust, thereby increasing the temperature of the exhaust gas and regenerating the DPF without altering the torque produced by the engine. It will be appreciated that the post fuel injection may be delivered during alternate time intervals, in other examples. Furthermore, one or more main fuel injections and/or pilot fuel injections which generate engine torque may be implemented preceding the post fuel injection. In some examples, the rate of change of the engine torque may be based on a rate of change of the main and/or pilot fuel injection(s).

However, during certain operating conditions, regeneration may occur during transient operation. FIGS. 3A and 3B show graphs depicting a prophetic example of a control strategy of an emission control system during transient operation without the compensation of the present application. Specifically, the control strategy does not take into account the various transient operating conditions as noted herein. The exhaust gas temperature, downstream of the DOC (e.g. post-DOC) is shown on the y-axis and time is on the x-axis, in FIG. 3A. Line 302 shows the post-DOC temperature set-point which may facilitate regeneration of a DPF positioned downstream of the DOC. Post-DOC refers to a location downstream of the DOC in the emission control system. Line 304 shows the actual post-DOC temperature.

In FIG. 3B the torque produced by the engine is on the y-axis and time is on the x-axis. Line 306 shows the actual torque produced by the engine. As can be seen, when a decrease is torque occurs (e.g. deceleration), that is to say that the torque derivative decreases, the post-DOC temperature overshoots (decreases beyond) the temperature set-point. As previously discussed the temperature overshoot may be caused by the incongruity between the response time of the fuel path and the air path during transient operation. In other words, the fuel may be injected into the intake manifold according to steady state operation while the airflow through the intake manifold is still catching up to steady state figures. Subsequently, the controller attempts to make a correction to counter the temperature overshoot. However, an overcorrection is made and the temperature is greater than the set point. Due to thermal inertia within certain components of the exhaust, such as the turbine of the turbocharger, it may take an extended duration of time to return to the set point after an overcorrection is made and the temperature has increased past the set-point.

Likewise, when the engine accelerates, the post-DOC temperature increases to a level above the temperature set-point. Subsequently, the controller attempts to correct the temperature overshoot. However, an overcorrection is made and the temperature decreases past the temperature set-point. Due to the thermal inertia of the turbocharger, it may take an extended duration of time to return to the temperature set-point after an overcorrection is made.

The types of inaccuracies depicted in FIG. 3A may degrade other components within the emission control system due to the large temperature fluctuations. Moreover, the duration of regeneration may be extended and/or the amount of particulate matter combusted during regeneration may be decreased due to the temperature fluctuations. However, the inventors herein have recognized that the rate of change of engine torque may be correlated to at least some of the above temperature errors. Further, the inventors herein have recognized that the effect of turbocharger thermal inertia may correlate to the remaining temperature errors. As such, the approach of FIG. 4 may be used to address the temperature deviations illustrated in FIG. 3A.

Specifically, control strategy 400, depicted in FIG. 4, is provided to increase the accuracy of temperature control by adjustment of post fuel injection, including during transient engine conditions. Control strategy 400 may be implemented utilizing the systems and components described above. Specifically, in some examples, the emission control system may include a DPF position downstream of a DOC which is positioned downstream of a turbocharger turbine in an exhaust of an internal combustion engine. However, it will be appreciated that alternate arrangements are possible, therefore in other examples control strategy 400 may be implemented utilizing other suitable systems and components.

First, at 402 operating conditions of the vehicle and internal combustion engine are determined. The operating conditions may include determining the torque produced by the engine at 402A, determining the exhaust gas temperature at 402B, determining the pressure upstream and downstream of a DPF at 402C, and determining the exhaust gas composition upstream and/or downstream of the DPF at 402D. It will be appreciated that in some examples, the temperature of the exhaust gas downstream of a turbine and upstream of a diesel particulate filter and/or a DOC may be determined at 402B, via measurement or estimation, or combinations thereof.

Next at 404, it is determined if regeneration of the DPF should occur. In some examples, a threshold pressure differential across the DPF may be used to determine if the DPF should be regenerated. However, in other examples, regeneration of the DPF may occur after the vehicle has traveled over a threshold distance or has surpassed a threshold time interval of engine operation. If it is determined that the DPF should not be regenerated (NO at 404) the control strategy ends.

However, if it is determined that the DPF should be regenerated (YES at 404) the control strategy includes at 405 implementing a regenerative control strategy for the DPF. The regenerative control strategy may include establishing a temperature set-point of the exhaust upstream of the DPF, and adjusting operating conditions to increase exhaust temperature to the set-point. In particular, a temperature set-point may be established for a location upstream of a DPF and downstream of a DOC. It will be appreciated that implementing a regenerative control strategy may further include delivering a post fuel injection to the combustion chamber based on steady state conditions. Furthermore, it will be appreciated that the exhaust gas air-fuel ratio may be lean during DPF regeneration to promote removal of the particulate matter in the DPF. In this way, the exhaust gas temperature may be altered without adjusting the torque produced by the engine.

At 406, it may be determined if the engine is in transient operation. It will be appreciated that in some examples, it may be determined when a change in engine torque (e.g. an engine indicated, or combustion, torque derivative with respect to time) has surpasses a threshold value. Thus, if the absolute value of the torque derivative surpasses the threshold value, it may be determined that the engine is in transient operation. The threshold value may be calculated utilizing one or more of the following parameters: engine temperature, ambient temperature, engine speed, turbocharger speed, throttle position, and an amount of a pilot fuel injection and/or a main fuel injection. If it is determined that the engine is not in transient operation (NO at 406) the method proceeds to 407 where steady state regeneration of the DPF is performed, independent of the rate of change of engine torque and/or turbocharger thermal inertia. In other examples, the method may return to 406 or alternatively may end.

If it is determined that the engine is in transient operation, the method advances to 408, where a post fuel injection, such as a far post fuel injection, may be adjusted by a first amount based on the rate of change of engine torque during DPF regeneration. The adjustment may be dependent on the sign of the rate of change of engine torque, as described herein. In some examples, adjusting the post fuel injection by a first amount may include at 408A determining an engine torque derivative, at 408B determining a fuel quantity modifier based on the engine torque derivative, and at 408C applying the fuel quantity modifier to an open loop post fuel injection strategy. It will be appreciated that in other examples alternate strategies may be used to adjust the post injection based on the change in engine torque. Further, in some examples, the fuel quantity modifier may increase the amount of fuel delivered via a post injection during deceleration and decrease the amount of fuel delivered via a post injection during acceleration. In other words, the magnitude of the post injection may be reduced when the rate of change of the engine torque is positive and increased when the rate of change of the engine torque is negative.

Further, it will be appreciated that in some examples, the post injection may be adjusted by the first and/or second amount before engine airflow ramps up due to an increase in engine torque when the rate of change of torque is positive. Furthermore, the post injection may be adjust by the first and/or second amount before engine airflow ramps down due to the decreased engine torque when the rate of change of torque is negative. In this way, overshoot of an exhaust temperature set-point caused by a mismatch in the response of gas flow through the system as compared to fuel flow through the system may be decreased.

Furthermore, the post fuel injection control may be calibrated independently from an air path feedback controller, simplifying the calibration process when compared to other control strategies utilizing mass air flow and intake manifold pressure as an indicator of air-flow during transient engine operation.

It will be appreciated that both open and closed loop algorithms may be used to control the post fuel injection and therefore the temperature of the exhaust gas in some examples. Suitable closed loop algorithms may include a proportional integral derivative (PID) algorithm, a feedback control algorithm, etc.

Next, at 410, the post fuel injection, such as a far post fuel injection, is adjusted by a second amount based on the thermal inertia of the turbine of the turbocharger positioned in the exhaust upstream of the DOC. In some examples the first amount and the second amount are different. Specifically, in some examples, adjusting the post fuel injection by the second amount may include at 410A determining a steady state temperature of the exhaust gas upstream of the DOC and downstream of the turbine. However, it will be appreciated that in other examples, the temperature upstream of the turbine may be determined. Adjusting the post fuel injection may further include at 410B determining the difference between the steady state temperature and a transient (e.g., currently measured or estimated) exhaust gas temperature of the exhaust gas upstream of the DOC and downstream of the turbine. In this way, the thermal inertia of the turbine may be quantified. However, it will be appreciated that alternate algorithms may be used to determine the thermal inertia of the turbocharger. As noted, in some examples, the transient exhaust gas temperature may be measured via a temperature sensor. However in other examples, the transient exhaust gas temperature may be calculated utilizing one or more of the following parameters: engine temperature, ambient temperature, throttle position, and air-fuel ratio.

Adjusting the post fuel injection by the second amount may further include at 410C, applying the difference between the steady state and transient temperature to a DOC model, which may be an inverse model, to determine an additional post injection modifier. In some examples, the additional post injection modifier may be applied to a closed loop post fuel injection quantity. In this way, the thermal inertia of the turbine may be compensated for by further adjustment of the post fuel injection. However, it will be appreciated that alternate techniques may be utilized to compensate for the thermal inertia of the turbine. Next at 412 the method includes delivering exhaust gas to a turbocharger turbine, then to an oxidation catalyst, and then to the DPF. After 412 the control strategy ends or alternatively, in other embodiments, returns to the start.

It will be appreciated that a closed and open loop control strategy may be implemented at overlapping or concurrently time intervals to control adjustment of a post injection. In this way, the temperature of the exhaust gas downstream of the DOC may be more accurately controlled to avoid exhaust temperatures which may degrade other components within the emission control system such as the SCR catalyst and the DOC. Furthermore, it will be appreciated that steps 408 and 410 may be implemented over a plurality of combustion cycles.

Figure 5A:
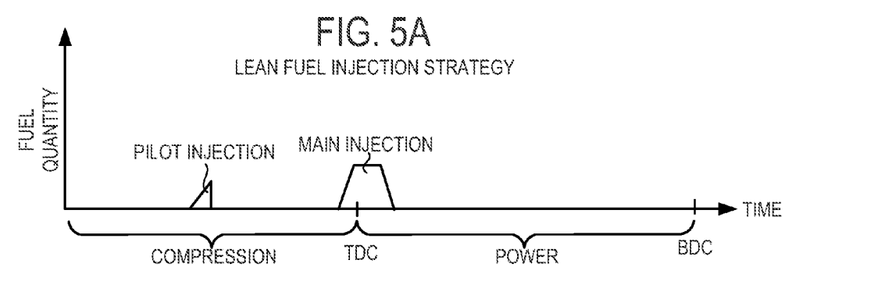
FIG. 5A illustrates a lean fuel injection strategy which may be implemented during normal engine operation.
Figure 5B:
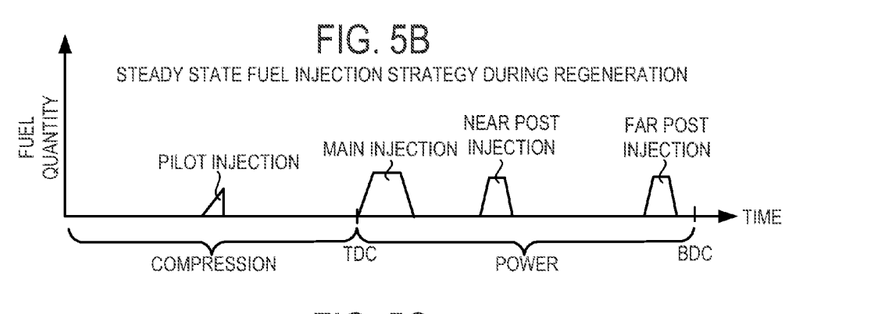
FIGS. 5B-5D illustrate various fuel injection strategies which may be carried out during regeneration of an emission control device.
Figure 5C:
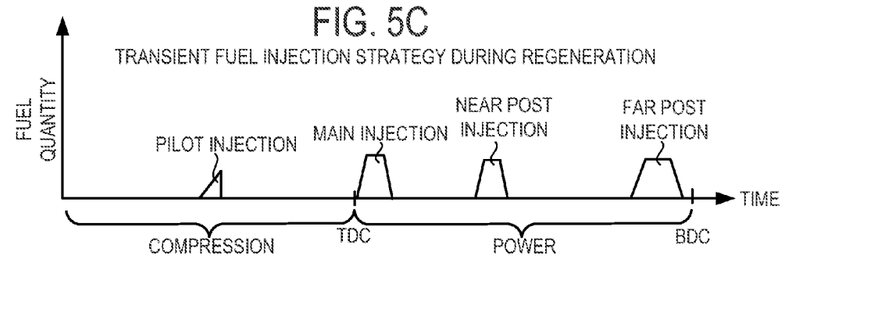
Figure 5D:
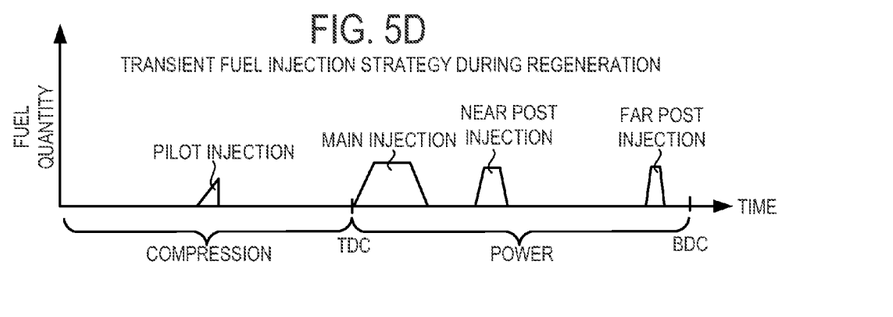

FIGS. 5A-5D illustrate exemplary fuel injection strategies which may be carried out during engine operation. In particular, FIG. 5A illustrates an exemplary lean fuel injection strategy which may be carried out during lean engine operation during which combustion cycles are occurring and regeneration of the DPF is not being implemented. FIGS. 5B-5D illustrates exemplary fuel injection strategies which may be carried out during regeneration of a DPF. The lean fuel injection strategy, shown in FIG. 5A, includes a pilot fuel injection is delivered to the cylinder during a compression stroke and a main fuel injection is delivered to the cylinder during both the compression stroke and a power stroke. However, it will be appreciated that the duration, amplitude, and/or timing of both the pilot fuel injection as well as the main fuel injection may be adjusted, in other examples.

FIG. 5B illustrates an exemplary injection strategy which may be carried out during steady state conditions during regeneration of a DPF. FIGS. 5C and 5D illustrate exemplary injection strategies which may be carried out during transient engine operation while the DPF is being regenerated. As depicted, a pilot fuel injection may be implemented during a compression stroke and a main fuel injection may be implemented during an intake stroke, the pilot and main fuel injection causing a torque producing event (e.g. a combustion event). Thus, the rate of change of engine torque may be based on a rate of change of the main fuel injection. Furthermore, a near post injection may be implemented during the first half of the power stroke, as previously discussed. In some examples, the near post injection may increase the torque produced by the engine. Additionally, a far post fuel injection may be implemented during the power stroke, as depicted. However, it will be appreciated that in other examples the far post fuel injection may be implemented during an exhaust stroke or both late in the power stroke and early in the exhaust stroke. The far post fuel injection may not significantly increase the torque produced by the engine, in some examples. Additionally, the far post fuel injection may be adjusted to compensate for transient conditions such as turbo thermal inertia as well as the response time between the fuel control and the air control within the intake, as discussed above. As shown in FIG. 5C the duration of the far post fuel injection may be adjusted (e.g. increased) during transient engine operation when the engine torque decreases. Furthermore, as shown in FIG. 5D, the quantity of fuel delivered via the far post fuel injection may be adjusted (e.g. decreased) during transient engine operation when the engine torque increases.

It will be appreciated that the graphs depicted in FIGS. 5A-5D are exemplary in nature and additional or alternate fuel injection strategies may be implemented in other embodiments. For example, the amplitude, duration, and/or timing of the pilot fuel injection, main fuel injection, near post fuel injection, and/or far post fuel injection may be adjusted in other examples. In particular, the far post fuel injection may be implemented at least partially during the compression or exhaust stroke. Also, the pilot fuel injection, main fuel injection, near post fuel injection, and/or far post fuel injection may include two or more injection events which may have different durations and/or amplitudes, in other examples. Still further in other examples it will be appreciated that the adjustment of the far post fuel injection may be implemented over a plurality of combustion cycles.

The systems and methods described above, allow regeneration of an emission control device, such as a diesel particulate filter, to be accurately controlled during transient engine operation. In particular the transient post fuel injection errors during regeneration may be diminished, decreasing duration of regeneration of the diesel particulate filter while decreasing the likelihood of degradation of other components within the emission control system, such as the diesel oxidation catalyst, the selective catalytic reduction catalyst, etc., due to an over or under temperature condition caused by a temporarily mismatch in the response of gas flow through the system as compared to fuel flow through the system and the thermal inertia of the turbine.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Further, the temporarily increase or decrease in turbocharger rotation acceleration and/or deceleration when passing through a resonant frequency band may affect engine speed, engine airflow, engine air/fuel ratio, engine torque, etc. As such, various countermeasures may be taken by the control system to counteract these affects, such as temporarily adjusting throttle position (e.g., temporarily decreasing throttle position) during, and contemporaneously with, temporarily increasing turbocharger acceleration, or vice versa. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an engine including a diesel particulate filter, comprising:
    while implementing a post fuel injection based on exhaust temperature, reducing an amount of the post fuel injection when a rate of change of engine torque during diesel particulate filter regeneration is positive, and increasing the amount when the rate of change is negative.

2. The method of claim 1, further comprising delivering exhaust gas to a turbocharger turbine, then to an oxidation catalyst, and then to the diesel particulate filter, the adjusting of the post fuel injection amount further based on a thermal inertia of the turbocharger turbine.

3. The method of claim 2, wherein the thermal inertia of the turbocharger turbine is based on a difference between a steady state pre-oxidation catalyst temperature and an actual, transient, pre-oxidation catalyst temperature.

4. The method of claim 1, wherein the post fuel injection includes a fuel injection event which is delivered during a cylinder cycle subsequent to an engine torque producing injection event, the post fuel injection during one or more of a power stroke or exhaust stroke of the cylinder cycle.

5. The method of claim 1, wherein an exhaust gas air-fuel ratio is lean during diesel particulate filter regeneration.

6. The method of claim 1, further comprising at least one main injection that generates the engine torque, the rate of change of engine torque based on a rate of change of the main injection.

7. The method of claim 6, wherein the adjusting occurs before engine airflow ramps up due to an increased engine torque when the rate of change of torque is positive, and wherein the adjusting occurs before engine airflow ramps down due to a decreased engine torque when the rate of change of torque is negative.

8. The method of claim 1 wherein the post fuel injection increases exhaust temperature without adjusting an engine torque output.

9. A method for operating an engine including an emission control system having a diesel oxidation catalyst coupled upstream of a diesel particulate filter, the method comprising:
    while implementing a post fuel injection based on exhaust temperature:
        adjusting the post fuel injection by a first amount based on a derivative of engine torque during regeneration of the diesel oxidation catalyst, the post fuel injection including a fuel injection event which is delivered to a combustion chamber during a time interval subsequent to a main fuel injection, wherein the adjusting by the first amount includes reducing the amount when the rate of change is positive, and increasing the amount when the rate of change is negative; and
        adjusting the post fuel injection by a second amount based on a steady state temperature determination upstream of the diesel oxidation catalyst.

10. The method of claim 9, wherein the post fuel injection increases the exhaust temperature without adjusting a torque output of the engine.

11. The method of claim 9, wherein adjusting the post fuel injection by a first amount includes applying a post fuel injection quantity modifier to an open loop post fuel injection quantity.

12. The method of claim 9, wherein adjusting the post fuel injection by a second amount includes applying a post fuel injection quantity modifier to a closed loop post fuel injection quantity.

13. The method of claim 9, wherein closed loop control strategy is included in a temperature control loop downstream of the diesel oxidation catalyst.

14. The method of claim 9, further comprising prior to adjustment of the post fuel injection, injecting fuel into a cylinder at least partially during a compression stroke.

15. The method of claim 9, wherein a post diesel oxidation catalyst temperature set-point is established to promote regeneration of the diesel particulate filter.

16. The method of claim 9, wherein the first and second amounts are different.

17. The method of claim 9, wherein the first and second amounts are applied at different time intervals during the regeneration.

18. The method of claim 9, wherein the post fuel injection is adjusted over a plurality of combustion cycles.

19. A method for operating an engine including an emission control system having a diesel oxidation catalyst coupled upstream of a diesel particulate filter, the method comprising:
    injecting fuel into a cylinder at least partially during a compression stroke;
    while implementing a post fuel injection based on exhaust temperature: adjusting the post fuel injection by a first amount based on a derivative of engine torque during regeneration of the diesel oxidation catalyst, the post fuel injection including a fuel injection event which is delivered to a combustion chamber during a time interval subsequent to a main fuel injection, adjusting by the first amount including reducing the amount when the rate of change is positive, and increasing the amount when the rate of change is negative; and
    adjusting the post fuel injection by a second amount based on a steady state temperature determination upstream of the diesel oxidation catalyst.

20. The method of claim 19, wherein the post fuel injection increases an exhaust temperature without adjusting a torque output of the engine.

* * * * *